US009416637B2

(12) United States Patent
Allouche

(10) Patent No.: US 9,416,637 B2
(45) Date of Patent: Aug. 16, 2016

(54) INTEGRATED CHOKE MANIFOLD SYSTEM FOR USE IN A WELL APPLICATION

(75) Inventor: Francis Allouche, Nogent Sur Marne (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1093 days.

(21) Appl. No.: 13/509,612

(22) PCT Filed: Nov. 10, 2010

(86) PCT No.: PCT/EP2010/006843
§ 371 (c)(1),
(2), (4) Date: Jul. 18, 2012

(87) PCT Pub. No.: WO2011/057774
PCT Pub. Date: May 19, 2011

(65) Prior Publication Data
US 2012/0273228 A1 Nov. 1, 2012

Related U.S. Application Data

(60) Provisional application No. 61/260,501, filed on Nov. 12, 2009.

(51) Int. Cl.
*E21B 43/12* (2006.01)
*E21B 21/10* (2006.01)
*E21B 34/00* (2006.01)
*F16K 3/02* (2006.01)

(52) U.S. Cl.
CPC .............. *E21B 43/12* (2013.01); *E21B 21/106* (2013.01); *E21B 34/00* (2013.01); *F16K 3/029* (2013.01)

(58) Field of Classification Search
CPC ........................................ E21B 43/12
USPC ................................. 166/386, 91.1
See application file for complete search history.

(56) References Cited

U.S. PATENT DOCUMENTS

| 2,131,836 | A | | 10/1938 | Davidson | |
|---|---|---|---|---|---|
| 3,362,487 | A | * | 1/1968 | Lindsey | E21B 21/08 138/45 |
| 3,637,012 | A | * | 1/1972 | Sizer et al. | 166/250.04 |
| 3,696,835 | A | * | 10/1972 | Pauliukonis | 137/625.6 |
| 3,847,372 | A | * | 11/1974 | Litchfield | E21B 21/106 137/315.39 |
| 4,544,135 | A | * | 10/1985 | Albaugh | 254/108 |
| 4,601,342 | A | | 7/1986 | Pringle | |
| 4,612,955 | A | | 9/1986 | Purvis | |
| 4,630,675 | A | * | 12/1986 | Neipling et al. | 166/53 |
| 6,484,816 | B1 | * | 11/2002 | Koederitz | E21B 21/08 175/25 |

(Continued)

FOREIGN PATENT DOCUMENTS

WO    WO 2006120537 A2 * 11/2006  ............. E21B 43/12

*Primary Examiner* — David Bagnell
*Assistant Examiner* — Ronald Runyan
(74) *Attorney, Agent, or Firm* — Cameron Sneddon

(57) ABSTRACT

A system and method enabling flow control with respect to a well related fluid. The system utilizes a choke manifold with a choke that can serve the function of both a fixed choke and an adjustable choke. The choke comprises components that are selectively adjusted to effectively provide differing calibrated flow paths along which the well related fluid flows when passing through the choke manifold. The choke manifold also may be combined with other system components in an efficient arrangement that facilitates handling of a variety of fluids, including multiphase fluids.

27 Claims, 6 Drawing Sheets

(56) References Cited

U.S. PATENT DOCUMENTS

| | | |
|---|---|---|
| 7,648,120 B1 * | 1/2010 | Kota et al. .................... 251/212 |
| 2003/0196804 A1 * | 10/2003 | Riet ............................ 166/267 |
| 2005/0092523 A1 | 5/2005 | McCaskill et al. |
| 2006/0112773 A1 * | 6/2006 | Hedtke ..................... 73/861.61 |
| 2008/0197306 A1 * | 8/2008 | Judge .................... E21B 33/062 251/1.3 |

* cited by examiner

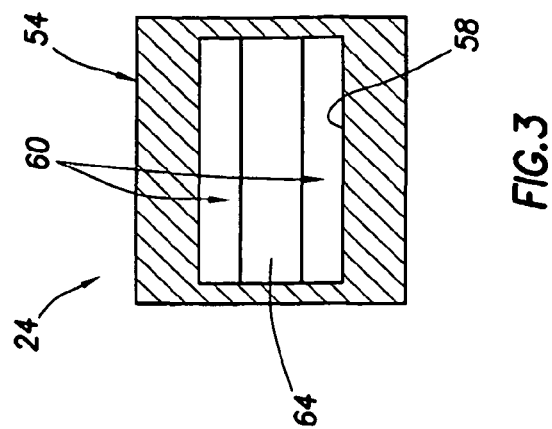
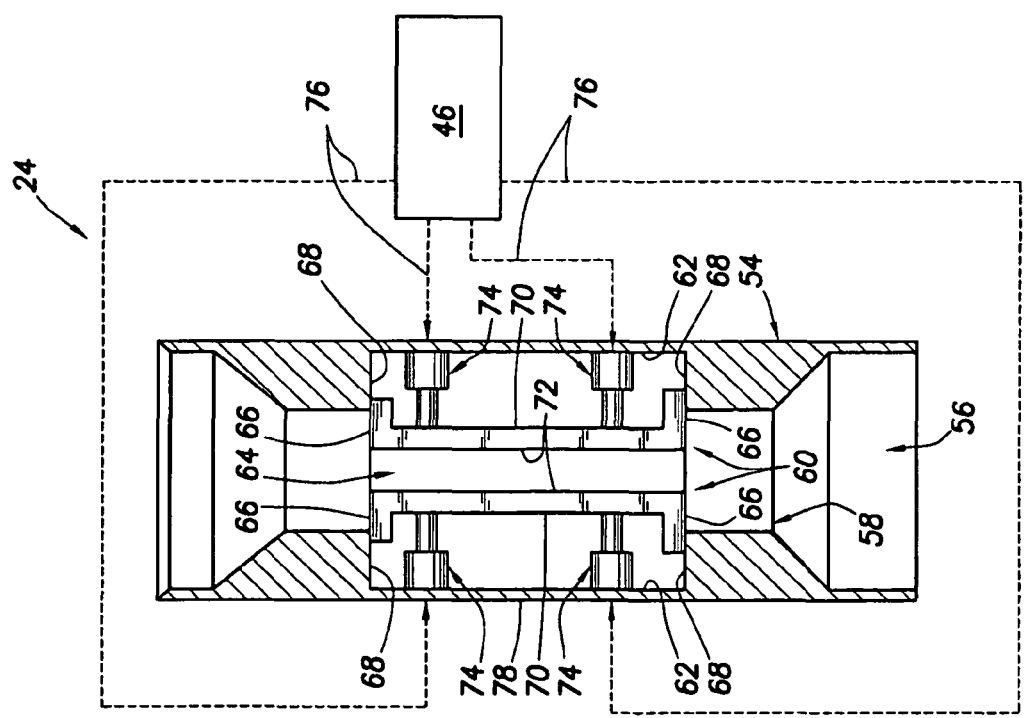

INTEGRATED CHOKE MANIFOLD SYSTEM FOR USE IN A WELL APPLICATION

CROSS-REFERENCE TO RELATED APPLICATION

The present application is based on and claims priority to U.S. Provisional Patent Application No. 61/260,501, filed Nov. 12, 2009.

TECHNICAL FIELD

The present disclosure relates generally to flow control devices, and more particularly to flow control devices used in well applications.

BACKGROUND

In a variety of well testing, well clean-up, and flow applications, recovered fluids can be directed up from a subterranean location and/or other fluids can be directed down into a well for various testing, production, cleaning and service procedures. The flowing fluids often contain multiphase fluids, and require various choke manifolds to be used in an attempt to regulate the fluid flow. The choke manifold or manifolds may be positioned at a surface location, or downhole, and comprise fluid passages for routing the fluid through appropriate choke circuits.

Convention choke manifold systems often comprise a set of high-pressure valves and associated piping that define at least two choke circuits in which two adjustable chokes are arranged such that one adjustable choke may be isolated and taken out of service for repair and refurbishment while well flow is directed through the other adjustable choke. The choke circuit also typically includes a fixed choke, which enables regulation of a calibrated flow.

The adjustable choke, also referred to as a choke bean, contains a replaceable insert, or bean, made from hardened steel or similar durable material that can be changed to adjust the flow rate. The insert is manufactured with a precise diameter hole that forms the choke through which all fluids must pass. Choke inserts are available in a complete range of sizes, generally identified by choke diameter stated in 64ths of an inch; for example, a "32 bean" is equivalent to a ½-in. choke diameter. The adjustable choke typically does not allow an accurate choke size due to the complex geometry of the flow around the choke bean. Consequently, the design creates difficulty in controlling the flow area through the orifice.

Additionally, the choke bean design is extremely sensitive to erosion and can be completely destroyed in only a few minutes if the well produces sand, debris, proppant or other particulates with high-speed flows through the choke. Changing of the fixed choke size, however, also can create substantial difficulty and requires opening of the system while flowing. This approach can be time-consuming and induce HSE concerns related to pressures and deleterious constituents, such as $H_2S$. Furthermore, fixed chokes can be plugged by large solids that become stuck in the orifice and block flow.

SUMMARY OF THE DISCLOSURE

In at least one aspect, the present invention addresses the above problems by providing a single choke circuit, which can be adjusted without the need to open the system to the environment while flowing.

In general, the present invention provides a technique for controlling flow of a well related fluid that may comprise a multiphase fluid. The system utilizes a choke manifold with a choke that can serve the function of both a fixed choke and an adjustable choke. The choke comprises components that may be selectively adjusted to effectively provide differing calibrated flow paths along which the well related fluid flows when passing through the choke manifold. The choke manifold also may be combined with other system components in an efficient arrangement that facilitates handling of a variety of fluids, including multiphase fluids.

BRIEF DESCRIPTION OF THE DRAWINGS

Certain embodiments of the present invention will hereafter be described with reference to the accompanying drawings, wherein like reference numerals denote like elements, and:

FIG. 2 depicts a schematic representation of one example of a choke manifold illustrated in FIGS. 1 and/or 1A, according to an embodiment of the present invention;

FIG. 3 depicts a schematic cross-sectional view illustrating movable sleeves that can be used to create calibrated flows through the choke manifold, according to an embodiment of the present invention;

DETAILED DESCRIPTION

Figure 1:
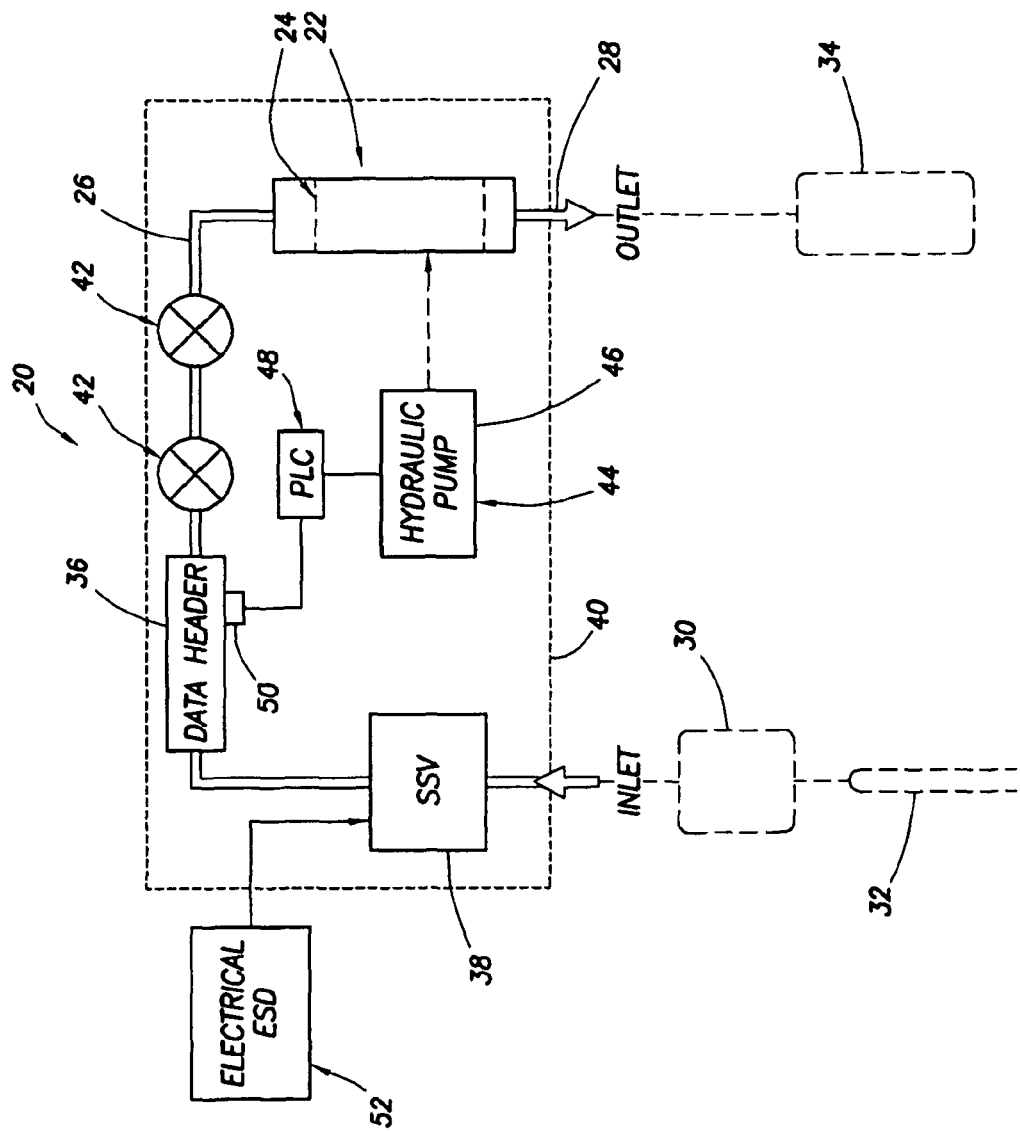
FIG. 1 depicts a schematic illustration of one example of a system for use in controlling flow of well related fluid, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention generally involves a technique related to well completions and testing. The technique utilizes an improved choke manifold system and a methodology that can be employed during, for example, well cleanup and flow periods or during other well related procedures. The manifold system is both adjustable and calibrated to regulate the flow of well related fluids, such as multiphase production fluids. Additionally, the choke manifold system may integrate an adjustable choke manifold with other components at a surface location in an efficient arrangement that facilitates regulation of fluid flow rates. In one application, the combination of components is used to regulate the flow rate of a multiphase fluid before that multiphase fluid enters a separator.

According to one embodiment, the unique choke manifold is combined with other components, e.g. a surface safety valve and a data header, at a surface location between a flowhead and a separator. The choke manifold and other components are combined into a single piece of equipment by, for example, mounting the components on a single skid.

The skid can be designed to accommodate a variety of other and/or additional components. For example, double pressure bathers, such as double block and bleed pressure bathers, can be positioned upstream of the choke manifold. Alternatively, for additional safety purposes, one pressure barrier may be positioned upstream and at least one other pressure bather may be positioned downstream of the choke manifold. In some embodiments, a manifold control system, such as a hydraulic pumping system, also is coupled to the adjustable choke manifold to enable selective recalibration of the choke manifold.

A controller, such as a programmable logic controller, also can be connected to the system between, for example, the data header and the manifold control system. The term, "controller," is used herein to describe a device that provides a feedback control loop, such as a PC board, a PID controller, and the like. in some embodiments, an emergency shutdown device is coupled with the surface safety valve to provide control over the closing of the surface safety valve. Furthermore, the data header may comprise a variety of sensors, such as pressure sensors, sand monitoring sensors, and other sensors, designed to detect parameters related to the flow control application. In addition, the data header may be used for chemical injections into the system.

The choke manifold comprises an adjustable choke that improves reliability and longevity while reducing the required operating time under solid loaded flow. The choke manifold combines the advantages of both an adjustable choke and a fixed choke to improve the control accuracy and the ease of control over flow of a variety of fluids, including multiphase production fluids. In one example, the adjustable choke has a cross-sectional flow area that is adjusted by external pressure, e.g. external hydraulic pressure. Additionally, control over the choke size may be automated based on a variable, e.g. a pressure variable, which can be helpful during, for example, cleanup operations in which large and highly dynamic transients can occur.

Referring generally to FIG. 1, a system 20 for use in controlling flow of well related fluids is illustrated according to an embodiment of the present invention. In this embodiment, system 20 is a choke manifold system comprising a choke manifold 22 having a choke 24 that is adjustable to regulate fluid flow, such as multiphase fluid flow. Fluid flows into choke manifold 22 through an upstream flowline 26 and out of choke manifold 22 through a downstream flowline 28. By way of example, choke manifold 22 may be positioned at a surface location between a flowhead 30, associated with one or more wells 32, and a separator 34 located on the downstream side of choke manifold 22.

Figure 1A:
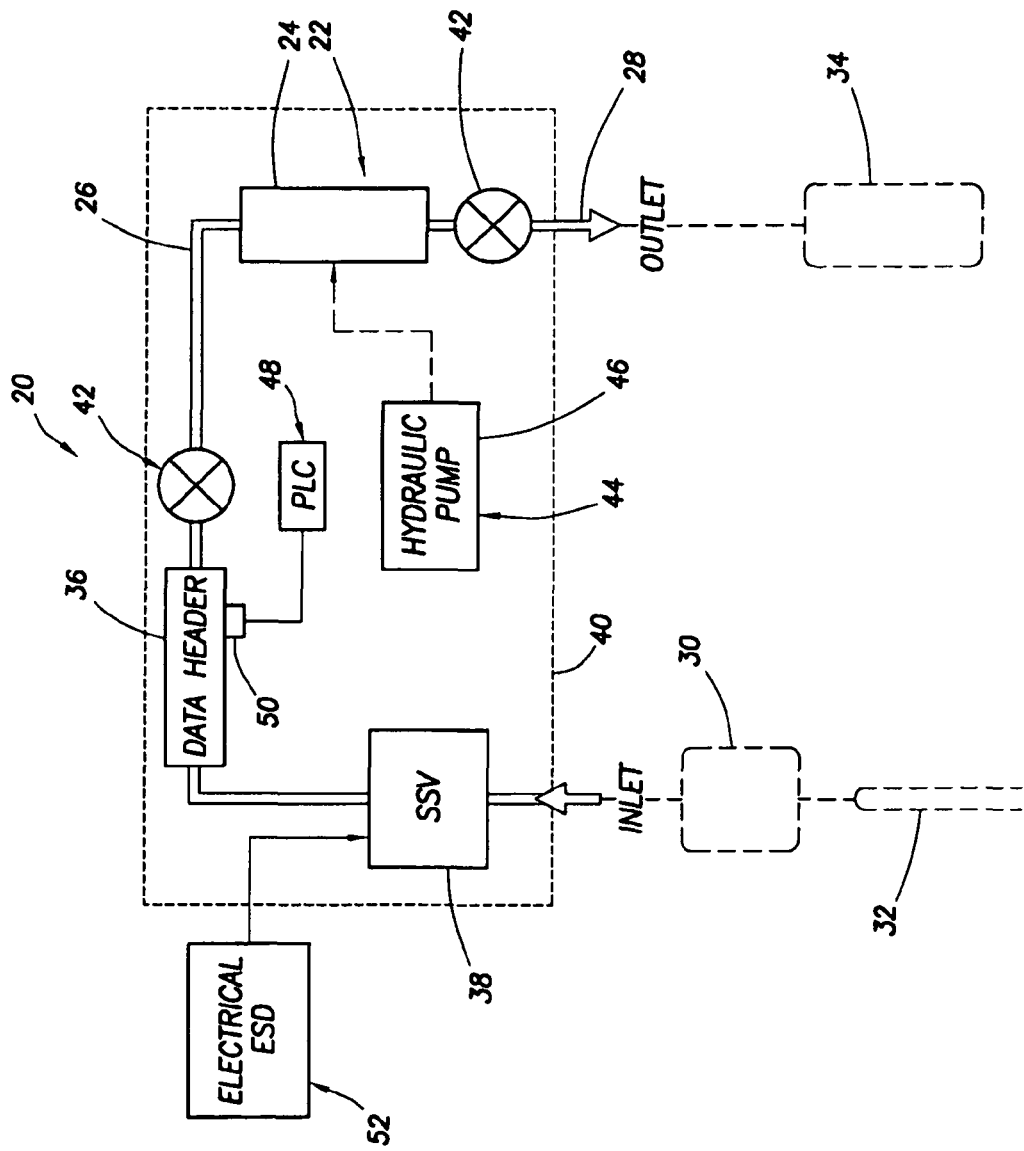
FIG. 1A depicts a schematic illustration of another example of a system for use in controlling flow of well related fluid, according to an embodiment of the present invention.

The system 20 also may comprise a data header 36 and a surface safety valve 38 positioned upstream of choke manifold 22. The choke manifold 22, data header 36 and surface safety valve 38 can be combined into a single piece of equipment by, for example, mounting the components on a single skid 40. System 20 also may comprise other components, such as a pressure barrier or a plurality of pressure barriers 42. In the specific embodiment illustrated in FIG. 1, system 20 comprises two pressure barriers 42 located between data header 36 and choke manifold 22. By way of example, the dual pressure barriers 42 may comprise two gate valves positioned in series to enable a unique fluid flow path through a single choke 24 that remains protected by the two pressure barriers 42. However, the system 20 does not require the above components, such as the pressure barrier or plurality of pressure barriers 42. Furthermore, the system 20 may be arranged in a variety of ways and should not be limited to the schematic illustrations depicted herein. For example, FIG. 1A, shows the system 20 comprising two pressure barriers 42, one located upstream the choke manifold 22 and another located on the downstream side of choke manifold 22.

The construction and adjustability of choke 24 combines the advantages of both an adjustable choke and a fixed choke by providing diameter adjustments/flow area adjustments that can be accurately calibrated. Adjustment of choke 24 may be controlled by a suitable actuation system 44 coupled with choke manifold 22. In some applications, choke 24 is actuated by pressure, such as hydraulic pressure, that is selectively input to cause actuation of choke 24 from one calibrated flow configuration to another calibrated flow configuration. In this latter example, actuation system 44 may comprise a hydraulic actuation system employing a small hydraulic pump 46 to provide suitable hydraulic inputs to choke manifold 22. Alternatively, actuation system 44 may comprise any suitable means to adjust the flow configuration, by way of example, but not by way of limitation, electric or pneumatic actuation. Actuation system 44 also may be mounted on single skid 40.

In sonic applications, actuation system 44 is controlled via a controller 48, e.g. a computer-based controller, that may be mounted on single skid 40 or at another suitable location. Controller 48 can be used to automatically control actuation system 44 based on a variety of inputs received from, for example, data header 36. However, other inputs can be provided to controller 48 manually or via other sensors. In the example illustrated, data is provided to controller 48 via one or more sensors 50 of data header 36, and/or one or more sensors of the choke manifold 24. The one or more sensors 50 of data header 36 may comprise a pressure sensor connected to the data header 36 to provide upstream pressure data to controller 48. Controller 48, in turn, processes this upstream data and provides appropriate output to actuation system 44 to control the adjustment of choke 24 and ultimately the flow of fluid through choke manifold 22. One or more pressure-type sensors may be incorporated into the choke manifold 22, or downstream the choke manifold 22, to provide data to the controller 48 indicative of the adjustment of the choke 24. Consequently, a control loop is established based on controller 48 processing upstream information, downstream information, and/or adjustment information to drive the actuation system 44 and adjust the choke size opening/flow area of choke 24.

In the embodiment illustrated, the surface safety valve 38 also may comprise an electrical actuator coupled with an emergency shutdown device 52. The emergency shutdown device 52 may be used instead of a pneumatic system to provide a quick response time. Thus, if any need arises for isolating the surface system 20 from well 32, the emergency shutdown device 52 can be used in cooperation with surface safety valve 38 to quickly isolate well 32.

Referring generally to FIG. 2, one example of adjustable choke 24 is illustrated; although other configurations and actuation techniques can be employed. In the example illustrated, choke 24 comprises a body 54 having a fluid flow passage 56 extending longitudinally therethrough. The fluid flow passage 56 may be defined in part by a throat 58, and one or more movable members 60 may be movably mounted in body 54 along the fluid flow passage 56 in the throat region 58. In the specific example illustrated, body 54 has a pair of recessed regions 62 into which a pair of movable members 60 are received. The pair of movable members 60 can be moved radially inward or outward, e.g. toward or away from each other without overlapping, to adjust the size of a flow area 64 through which fluid flows when passing through choke 24. As further depicted in FIG. 3, flow area 64 illustrates at least a portion of the adjustable cross-sectional area between movable members 60 that can be changed to precisely calibrate the flow of fluid through choke 24.

The functionality provided by the body 54 and movable members 60 enables the precise calibration of flow area 64 and the resultant flow of fluid through choke 24. By way of example, movable members 60 may be formed as sleeves having end sections 66 that slide in a generally radial direction along corresponding end surfaces 68 of recessed regions 62. In the specific example illustrated, each sleeve 60 comprises a flow guide section 70 that extends between its end sections 66 and presents a substantially flat surface/face 72 along which fluid, e.g. multiphase fluid, flows through choke 24. By moving the flat surfaces 72 of the sleeves 60 toward or away from each other, the flow area 64 can be precisely adjusted. In the specific example, the cross-sectional flow area 64 is generally rectangular in shape, as illustrated in the cross-sectional view of FIG. 3. Alternatively, however, each sleeve 60 and its corresponding end sections 66 may be of any appropriate shape to control the flow of fluid through the choke 24.

Movement of movable members 60 may be accomplished by actuators 74 which are controlled by actuation system 44. If actuation system 44 is a hydraulic actuation system, for example, the actuators 74 are hydraulic actuators, such as hydraulic jacks that can be expanded and contracted via input from hydraulic pump 46. Hydraulic pump 46 can be operated to deliver hydraulic fluid through appropriate hydraulic lines 76 to the various actuators 74 which in this particular example comprise hydraulic jacks. As illustrated, one or more hydraulic jacks 74 is positioned in each recessed region 62 between the movable member 60 and an external wall 78 of body 54. The system also may be pressure balanced by allowing fluid to flow into the recessed region 62 between wall 78 and movable members 60.

Figure 4:
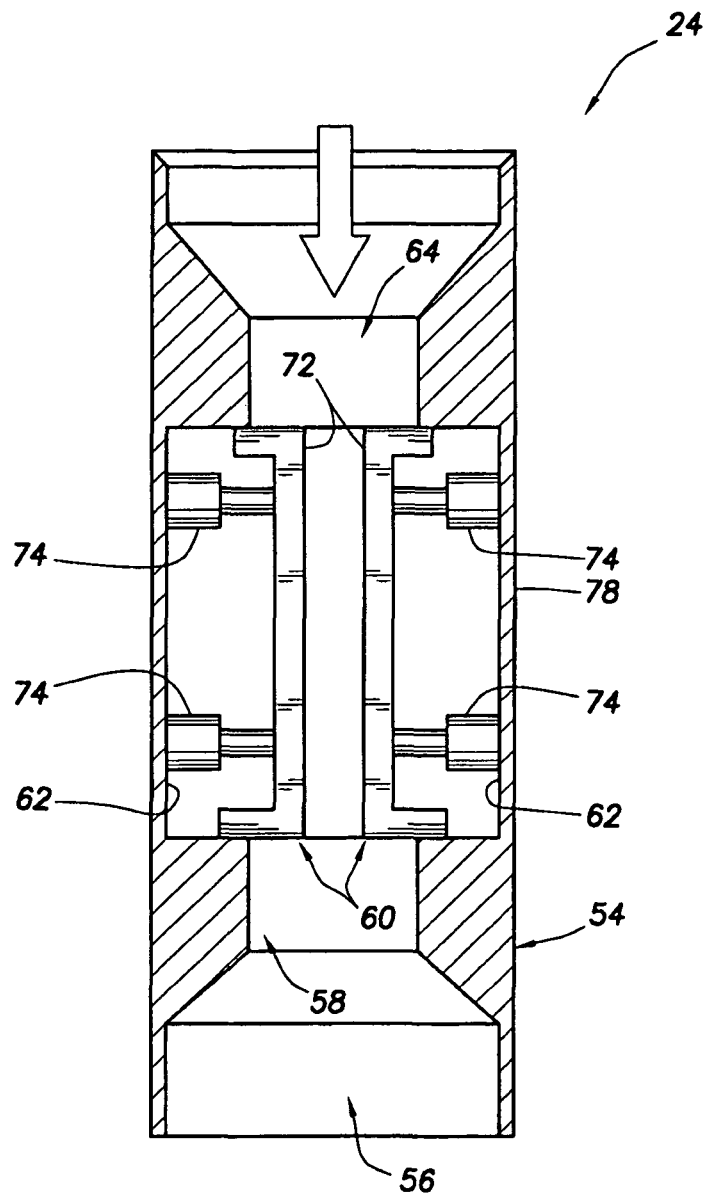
FIG. 4 depicts a schematic illustration of one example of an adjustable choke in a restricted configuration, according to an embodiment of the present invention.

The hydraulic jacks 74 are connected to movable members 60 such that contraction of the hydraulic jacks moves the movable members 60 away from each other, and extension of the hydraulic jacks moves the movable members 60 toward each other without overlapping. As illustrated in FIG. 4, for example, hydraulic pump 46 can be operated via input from controller 48 to adjust choke 24 to a perfectly calibrated but more restrictive flow configuration. In this example, the adjustment of choke 24 is achieved by extending actuators 74 to move sleeves 60 toward each other and to reduce the size of flow area 64. In some applications, the adjustment of choke 24 can be performed automatically by controller 48 via input from the sensor 50 associated with data header 36 and/or input from other sensors.

Figure 5:
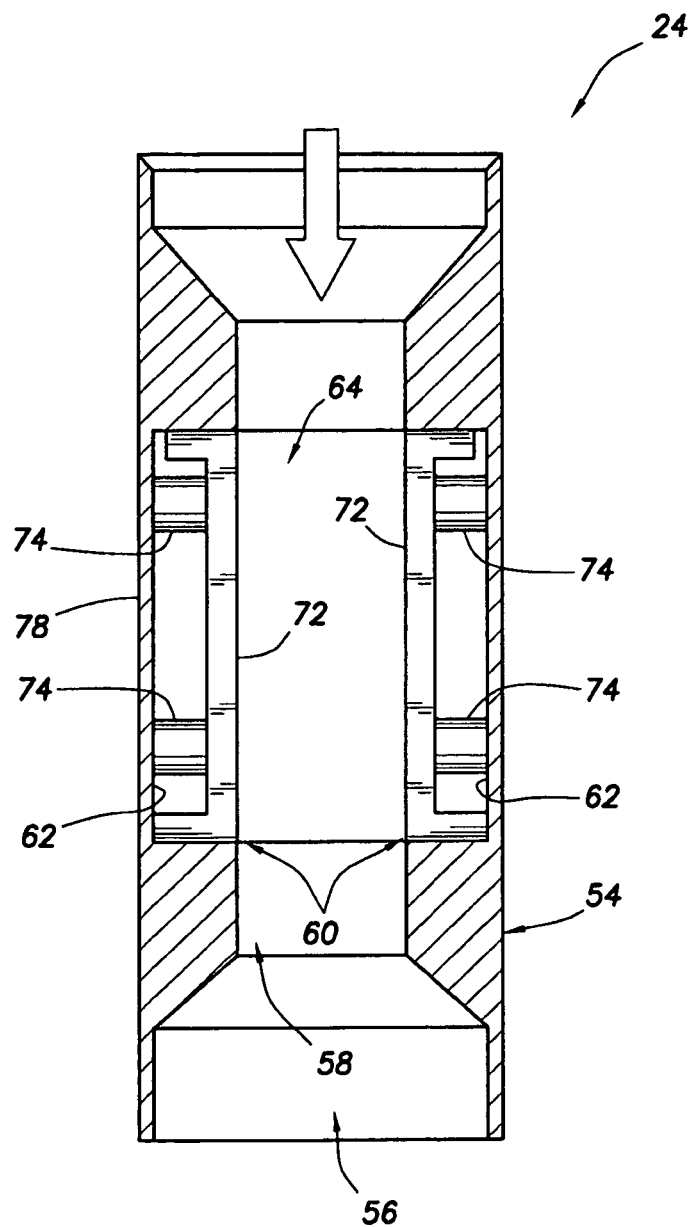
FIG. 5 depicts a schematic illustration of the adjustable choke illustrated in FIG. 4 but in a less restricted configuration, according to an embodiment of the present invention.

The design of movable members 60 enables the selective adjustment of choke 24 to a variety of perfectly calibrated flow positions. As illustrated in FIG. 5, for example, hydraulic pump 46 (or another suitable actuation system) is actuated via input from controller 48 to cause contraction of actuators 74. The contraction of actuators 74 pulls the sleeves 60 away from each other which increases the size of flow area 64 and accommodates increased flow of fluid through choke 24. The movable members 60 also can be moved away from each other to release debris or to otherwise facilitate clearing of the choke manifold 22.

Figure 6:
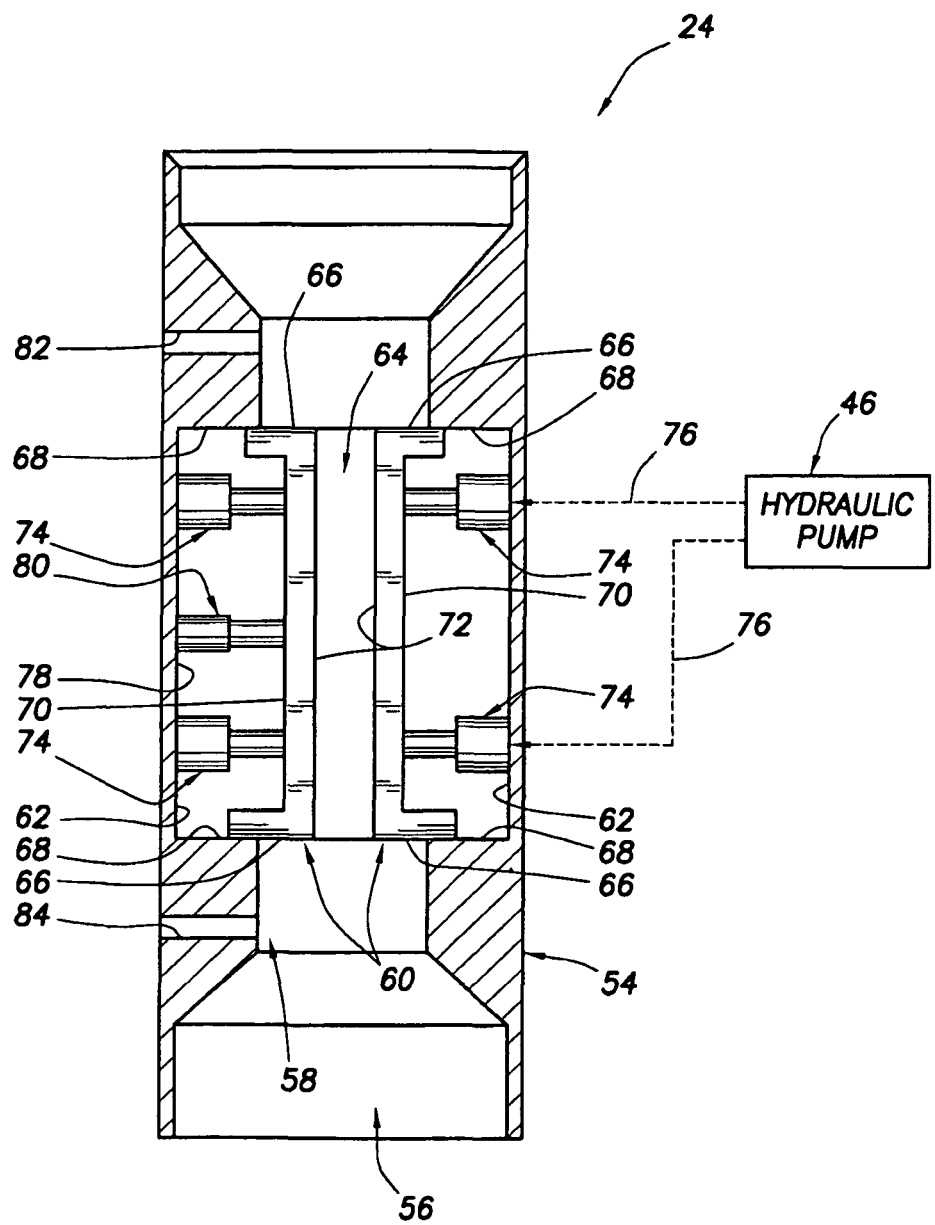
FIG. 6 depicts a schematic illustration of another example of a choke manifold illustrated in FIGS. 1 and/or 1A, according to an embodiment of the present invention.

Another example of adjustable choke 24 is depicted in FIG. 6 having at least one sensor 80 to detect the position of the sleeves 60. As described herein, information indicative of the position of the sleeves 60 may be fed back into the controller 48 to increase precision and calibration of the choke 24. Alternatively, however, the sensor(s) 80 may be in direct communication with the actuation system 44 to determine relative position of the pair of sleeves 60. Sensor 80 may be of any type that can detect position, or relative change in position. Examples may include, but are not limited to, a pressure-based sensor, a resistance-type sensor, an infrared sensor, and the like. Another embodiment of the adjustable choke 24 may include an upstream pressure port 82 and/or a downstream pressure port 84 to measure the pressure of the fluid flowing through the choke 24. Such pressure measurements may also be fed back into the controller 48, or the actuation system 44, to increase precision and calibration of the choke 24.

The system 20 may comprise a variety of components that are arranged in various configurations. For example, the choke manifold 22, data header 36, surface safety valve 38 and other components can be efficiently combined onto the single skid 40 to enhance efficiency of construction, operation and transport. Furthermore, many types of programmable logic controllers and other controllers may be used to provide varying degrees of automation with respect to the exercise of automatic control over choke 24 according to data received by the controller. Various types of pressure barriers also may be positioned on single skid 40 to provide desired barriers between components of the overall system. The overall system may be designed to operate at a variety of pressure ratings.

Additionally, choke manifold 22 may be constructed in a variety of sizes and configurations. Adjustable choke 24 may comprise one or more movable members that are able to provide precisely controlled, calibrated flows of fluid through the choke, such as flows of multiphase fluid. The use of two movable sleeve members works well in many applications; however, additional sleeves or other movable members can be employed and selectively actuated to precisely control the flow area. Furthermore, the manifold system can be used to deliver fluid to a separator or to a variety of other types of processing equipment incorporated into the overall design.

Although only a few embodiments of the present invention have been described in detail above, those of ordinary skill in the art will readily appreciate that many modifications arc possible without materially departing from the teachings of this invention. Accordingly, such modifications are intended to be included within the scope of this invention as defined in the claims.

What is claimed is:

1. A system for use in controlling flow of well related fluid, comprising:
    a choke manifold having a choke to regulate a multiphase fluid flow, the choke comprising:
        a body having a fluid flow passage;
        a pair of sleeves positioned in the body along the fluid flow passage; and
        an actuator coupled to the pair of sleeves and oriented to selectively move the pair of sleeves toward each other to without overlapping each other to restrict flow through the fluid flow passage and away from each other to further open the fluid flow passage.

2. The system as recited in claim 1, further comprising a positioning sensor calibrated to determine the relative position of the pair of sleeves.

3. The system as recited in claim 1, wherein the actuator comprises a hydraulic actuator.

4. The system as recited in claim 3, wherein the hydraulic actuator comprises a plurality of hydraulic jacks.

5. The system as recited in claim 1, further comprising an upstream pressure port and a downstream pressure port to measure the pressure of the multiphase fluid flow through the fluid flow passage.

6. The system as recited in claim 1, wherein each sleeve of the pair of sleeves has a generally flat face oriented toward the other sleeve of the pair of sleeves.

7. The system as recited in claim 1, further comprising at least one isolation valve located upstream of the choke.

8. The system as recited in claim 7, further comprising at least one isolation valve located downstream of the choke.

9. The system as recited in claim 7, further comprising a data header located upstream of the choke.

10. The system as recited in claim 9, wherein the data header comprises a pressure sensor positioned to measure pressure of a fluid flowing to the choke.

11. The system as recited in claim 10, further comprising a controller coupled between the data header and an actuation system used to control the position of the actuator in the choke, wherein data obtained from the data header is used by the controller to properly adjust the actuator.

12. The system as recited in claim 11, wherein the controller comprises a programmable logic controller.

13. The system as recited in claim 9, further comprising a surface safety valve located upstream of the choke.

14. A method for controlling flow of well related fluids, comprising:
    directing a multiphase well fluid to a choke manifold;
    providing a calibrated flow path through the choke manifold with a choke having sleeves that are movable toward and away from each other without overlapping each other to provide select, calibrated flow paths for the multiphase well fluid; and
    adjusting the sleeves to change the flow of multiphase fluid from one calibrated flow to a different calibrated flow.

15. The method as recited in claim 14, wherein adjusting comprises moving the sleeves in a radial direction via hydraulic input from a hydraulic actuation system.

16. The method as recited in claim 15, further comprising controlling the hydraulic actuation system with a programmable logic controller.

17. The method as recited in claim 14, wherein directing comprises routing the multiphase well fluid through a surface safety valve and a data header located upstream of the choke manifold.

18. The method as recited in claim 17, further comprising mounting the choke manifold, the surface safety valve, and the data header on a single skid.

19. The method as recited in claim 17, wherein adjusting comprises automatically adjusting the sleeves via a controller receiving data from the data header.

20. A system for use in controlling flow of well related fluid, comprising:
    a skid having a surface safety valve, a data header, and
    a choke manifold with an adjustable choke having sleeves that are movable toward and away from each other without overlapping each other and the choke having selectively calibrated flow positions based, at least in part, on data obtained from the data header.

21. The system as recited in claim 20, wherein the skid further comprises a pair of isolation valves located upstream of the choke manifold.

22. The system as recited in claim 21, wherein the skid further comprises an actuation system coupled to the adjustable choke to change the calibrated flow positions of the adjustable choke.

23. The system as recited in claim 22, further comprising a computer-based controller coupled between the data header and the actuation system, wherein the computer-based controller is able to automatically change the calibrated flow positions of the adjustable choke based on data from the data header.

24. The system as recited in claim 23, further comprising an emergency shutdown device coupled to the surface safety valve.

25. A method comprising:
    routing a well fluid through a choke manifold having a choke with a flow passage; and
    calibrating a rate of well fluid flow through the choke by moving a plurality of sleeves in a radial direction without overlapping each other with respect to the flow passage, wherein calibrating a rate of well fluid flow comprises moving from one calibrated flow configuration to another calibrated flow configuration.

26. The method as recited in claim 25, wherein calibrating comprises moving the plurality of sleeves with a plurality of hydraulic jacks.

27. The method as recited in claim 25, wherein calibrating comprises changing the distance between a pair of sleeves.

* * * * *